US008122086B1

(12) United States Patent  
King et al.

(10) Patent No.: US 8,122,086 B1
(45) Date of Patent: Feb. 21, 2012

(54) STRATEGIES FOR PRESENTING A SEQUENCE OF MESSAGES TO A USER

(75) Inventors: Joseph King, Seattle, WA (US); Christopher W. Goodrum, Seattle, WA (US); Daniel R. Dole, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1589 days.

(21) Appl. No.: 11/264,817

(22) Filed: Nov. 1, 2005

(51) Int. Cl.
*G06F 15/16* (2006.01)
*G06F 3/048* (2006.01)
(52) U.S. Cl. ......... 709/206; 709/219; 715/804; 715/805
(58) Field of Classification Search .................. 709/206
See application file for complete search history.

(56) References Cited

U.S. PATENT DOCUMENTS

| | | | | | |
|---|---|---|---|---|---|
| 6,014,638 | A | * | 1/2000 | Burge et al. ..................... | 705/27 |
| 6,606,101 | B1 | * | 8/2003 | Malamud et al. .............. | 715/715 |
| 6,792,448 | B1 | * | 9/2004 | Smith ............................ | 709/204 |
| 2002/0010625 | A1 | * | 1/2002 | Smith et al. ..................... | 705/14 |
| 2004/0083432 | A1 | * | 4/2004 | Kawamura et al. ........... | 715/526 |
| 2004/0098754 | A1 | * | 5/2004 | Vella et al. .................... | 725/135 |
| 2004/0260710 | A1 | * | 12/2004 | Marston et al. ............... | 707/100 |
| 2005/0038717 | A1 | * | 2/2005 | McQueen et al. ............. | 705/27 |

FOREIGN PATENT DOCUMENTS
WO    WO 01/25947 A1    4/2001

OTHER PUBLICATIONS

Venolia, G. and C. Neustaedter, Understanding Sequence and Reply Relationships within Email Conversations: A Mixed-Model Visualization, CHI 2003, Apr. 5-10, 2003.*
Infirmation.com discussion board example, available at <<http://www.infirmation.com/bboard/clubs-view-all.tcl?topic=Greedy%20IP>> and <<http://www.infirmation.com/bboard/clubs-fetch-msg.tcl?msg_id=002wvz>>, accessed on Feb. 12, 2006, 5 pages.
Scoop discussion board examples, available at <<http://scoop.kuro5hin.org/main>>, accessed on Feb. 12, 2006, 6 pages.
Levy, "In the New Game of Tag, All of Us Are It," Newsweek, available at <<http://msnbc.msn.com/id/7445653/site/newsweek/>>, accessed on Feb. 12, 2006, 3 pages.
Sterling, "Order Out of Chaos: What's the best way to tag, bag, and sort data? Give it to the unorganized masses," Wired Magazine, available at <<http://www.wired.com/wired/archive/13.04/view.html?pg=4>>, accessed on Feb. 12, 2006, 3 pages.

(Continued)

*Primary Examiner* — Jeffrey Pwu
*Assistant Examiner* — Jasmine Myers
(74) *Attorney, Agent, or Firm* — Lee & Hayes, PLLC

(57) ABSTRACT

Functionality is described herein for presenting a sequence of messages to the user arranged in chronological order. The functionality additionally annotates the messages with identifiers. Some of the identifiers convey the manner in which the identified messages relate to other messages in the sequence. The functionality therefore uniquely combines the merits of both a flat paradigm for organizing messages (by virtue of the arrangement of the messages in chronological order) and a nested paradigm for organizing messages (by virtue of the linking identifiers added to the messages).

53 Claims, 14 Drawing Sheets

OTHER PUBLICATIONS

U.S. Appl. No. 11/182,517, filed Jul. 15, 2005, Green et al., "Dynamic Updating of Rendered Web Pages With Supplemental Content".

U.S. Appl. No. 11/182,502, filed Jul. 15, 2005, Green et al., "Dynamic Supplementation of Rendered Web Pages With Content Supplied by a Separate Source."

U.S. Appl. No. 10/720,712, filed Nov. 24, 2003, Green, "Deterred and Off-Loaded Rendering of Selected Portions of Web Pages to Incorporate Late-Arriving Service Data."

Programming Talk discussion board example, available at <<http://www.programmingtalk.com/forumdisplay.php?f=117>>, accessed on Feb. 12, 2006, 3 pages.

Krim, "GMail Deepens Google's Advertising Flirtation," Washington Post, Sunday, Apr. 25, 2004, available at <<http://www.washingtonpost.com/wp-dyn/articles/A38662-2004Apr24.html>, accessed on Feb. 12, 2004, 3 pages.

Google Groups example, available at <<http://groups.google.com/group/rec.arts.sfwritten?lnk=gschg>>, accessed on Feb. 12, 2005, 4 pages.

Google Groups example, available at <<http://groups.google.com/group/rec.arts.sf.written/browse_thread/thread/f573f32127c18e72/b3b59807775138d3?lnk=raot#b3b59807775138d3>>, accessed on Feb. 12, 2005, 10 pages.

Google Groups example, available at <<http://groups.google.com/group/rec.arts.sf.written/browse_frm/thread/f573f32127c18e72/b3b59807775138d3?tvc=1#b3b59807775138d3>>, accessed on Faeb. 12, 2005, 3 pages.

EOpinions.com example, available at <<http://www.epinions.com/content_172216848004/show_~allcom/pp_~1/sort_~date/sort_dir_~asc/sec_~comment_list>>, accessed on Feb. 12, 2006, 2 pages.

Zimbra Collaborative Suite, introductory page for online demonstration, available at <<http://www.zimbra.com/flash_demo/flash_demo.html>>, accessed on Feb. 12, 2006.

Proposal for Canogo online service, "Compelling Email Features," available at <<http://wiki.osafoundation.org/bin/view/Jungle/CompellingEmailFeatures>>, accessed on Feb. 12, 2006, 7 pages.

Crocker, "RFC822: Standard for ARPA Internet Text Messages," available at <<http://www.w3.org/Protocols/rfc822/>>, accessed on Feb. 12, 2006, 40 pages.

Eirinaki et al., "SEWeP: using site semantics and a taxonomy to enhance the Web personalization process," Proceedings of the ninth ACM SIGKDD international conference on knowledge discovery and data mining, ACM Press, 2003, pp. 99-108.

* cited by examiner

"Flat" Discussion Thread

Theme: The Times Best Seller List } 120

"I think that the new book by John Smith is riveting! A real page-turner." } 118
by GeorgeT on Sat April 1st, 2006 at 10:30:12 PST
102

"I thought it was just OK -- a mediocre effort from a mediocre writer. His characters are one-dimensional, his writing is full of clichés."
by MrPrincetonHumanities on Sat April 1st, 2006 at 12:37:24 PST
104

"Come on. When I read a novel, I want to be entertained, not improve myself. I disliked English class with its high-brow interpretation of fiction."
by ChicagoSoxConquers on Sun April 2nd, 2006 at 14:56:34 PST
106

"Right, Joe. I read Smith's new book on a recent trip to Cancun. I got so entranced with the book I forgot that I was baking in the sun. What a sunburn I got!"
by BeachBum on Sun April 2nd, 2006 at 17:18:11 PST
108

"I see that you are from Princeton. I myself go to UVA. I am finishing up my MA in anthropology. The prospects are dim indeed."
by MonticelloBlues on Sun April 2nd, 2006 at 17:18:11 PST
110

"Monticello Blues, you've got that right. I am finishing up my MA in anthropology. What a terrible job market for PhD's in the humanities, right?"
by MrPrincetonHumanities on Mon April 3rd, 2006 at 7:43:07 PST
112

"Wow BeachBum, Sunburn is rough!, you should try SoothAid Max, it really can save an otherwise ruined vacation due to sunburn."
by BeachedWhale on Mon April 3rd, 2006 at 10:08:23 PST
114

Discussion Board    Welcome MonticelloBlues

Theme: The Times Best Seller List

402 Sat April 1st, 2006 at 10:30:12 PST – Initial Post
"I think that the new book by John Smith is riveting! A real page-turner."
Reply                                                                   by GeorgeT

404 { 422 { Sat April 1st, 2006 at 12:37:24 PST – In reply to (more) } 424
You replied to this post on Sun April 2nd, 2006 at 17:18:11 PST (more) } 426
"I thought it was just OK – a mediocre effort from a mediocre writer. His characters are one-dimensional, his writing is full of clichés.
Reply } 418                                                         by MrPrincetonHumanities } 420

406 Sun April 2nd, 2006 at 14:56:34 PST – In reply to (more)
"Come on. When I read a novel, I want to be entertained, not improve myself. I disliked English class with its high-brow interpretation of fiction.
Reply                                                                   by ChicagoSoxConquerors on

408 Sun April 2nd, 2006 at 17:18:11 PST – In reply to (more)
"Right, Joe. I read Smith's new book on a recent trip to Cancun. I got so entranced with the book I forgot that I was baking in the sun. What a sunburn I got!
Reply                                                                   by BeachBum

410 Sun April 2nd, 2006 at 17:18:11 PST – In reply to (more)
Your post } 428
"I see that you are from Princeton. I myself go to UVA. I am getting a PhD in comparative literature. What a terrible job market for PhD's in the humanities, right?
Reply                                                                   by MonticelloBlues

412 Mon April 3rd, 2006 at 7:43:07 PST – In reply to (more)
Replied to you } 430
"Monticello Blues, you've got that right. I am finishing up my MA in anthropology. The prospects are dim indeed."
Reply                                                                   by MrPrincetonHumanities

414 Mon April 3rd, 2006 at 10:08:23 PST – In reply to (more)
You replied to this post on Sun April 7th, 2006 at 12:14:13 PST (more) } 432
"Wow BeachBum, Sunburn is rough, you should try SoothAid Max, it really can save an otherwise ruined vacation due to sunburn."

Prior Page | Next Page

Discussion Board      Welcome MonticelloBlues

Theme: The Times Best Seller List

402 Sat April 1st, 2006 at 10:30:12 PST – Initial Post
"I think that the new book by John Smith is riveting! A real page-turner."
by GeorgeT
Reply

404 Sat April 1st, 2006 at 12:37:24 PST – In reply to (more)
You replied to this post on Sun April 2nd, 2006 at 17:18:11 PST (more) } 426
"I thought it was just OK – a mediocre effort from a mediocre writer. His characters are one-dimensi[onal]...
Reply

406 Sun April 2nd, 2006 at 14:56:34 PST – In reply to (more)
"Come on. When I read a novel, I want to be entertained, not improve myself. I disliked English clas[s]...
Reply

408 Sun April 2nd, 2006 at 17:18:11 PST – In reply to (more)
"Right, Joe. I read Smith's new book on a recent trip to Cancun. I got so entranced with the book I [...]
Reply

*Popup:*
Sun April 2nd, 2006 at 17:18:11 PST
MonticelloBlues
"I see that you are from Princeton. myself go to UVA. I am getting a PhD in comparative literature. What a terrible job market for PhD's in the humanities, right?"
502

410 Sun April 2nd, 2006 at 17:18:11 PST – In reply to (more)
Your post
"I see that you are from Princeton. I myself go to UVA. I am getting a PhD in comparative literature. What a terrible job market for PhD's in the humanities, right?
by MonticelloBlues
Reply

412 Mon April 3rd, 2006 at 7:43:07 PST – In reply to (more)
Replied to you
"Monticello Blues, you've got that right. I am finishing up my MA in anthropology. The prospects are dim indeed."
by MrPrincetonHumanities
Reply

414 Mon April 3rd, 2006 at 10:08:23 PST – In reply to (more)
You replied to this post on Sun April 7th, 2006 at 12:14:13 PST (more) } 432
"Wow BeachBum, Sunburn is rough, you should try SoothAid Max, it really can save an otherwise ruined vacation due to sunburn." →(Will invoke message that appears on later page, for presentation on present page)

Prior Page | Next Page

Discussion Board

Welcome MonticelloBlues

Theme: The Times Best Seller List

Sat April 1st, 2006 at 10:30:12 PST – Initial Post

"I think that the new book by John Smith is riveting! A real page-turner."

by GeorgeT

Reply

402

Sat April 1st, 2006 at 12:37:24 PST – In reply to (more)
You replied to this post on Sun April 2nd, 2006 at 17:18:11 PST (more)

"I thought it was just OK – a mediocre effort from a mediocre writer. His characters are one-dimensional, his writing is full of clichés."

by MrPrincetonHumanities

Reply

404

Sun April 2nd, 2006 at 14:56:34 PST – In reply to (more)

"Come on. When I read a novel, I want to be entertained, not improve myself. I disliked English class with its high-brow interpretation of fiction."

by ChicagoSoxConquers on

Reply

406

Sun April 2nd, 2006 at 17:18:11 PST – In reply to (more)

"Right, Joe. I read Smith's new book on a recent trip to Cancun. I got so entranced with the book I forgot that I was baking in the sun. What a sunburn I got!"

by BeachBum

Reply

408

Sun April 2nd, 2006 at 17:18:11 PST – In reply to: (more)
Your post:

"I see that you are from Princeton. I myself go to UVA. I am getting a PhD in comparative literature. What a terrible job market for PhD's in the humanities, am I right?"

Delete post          Cancel          Post your reply

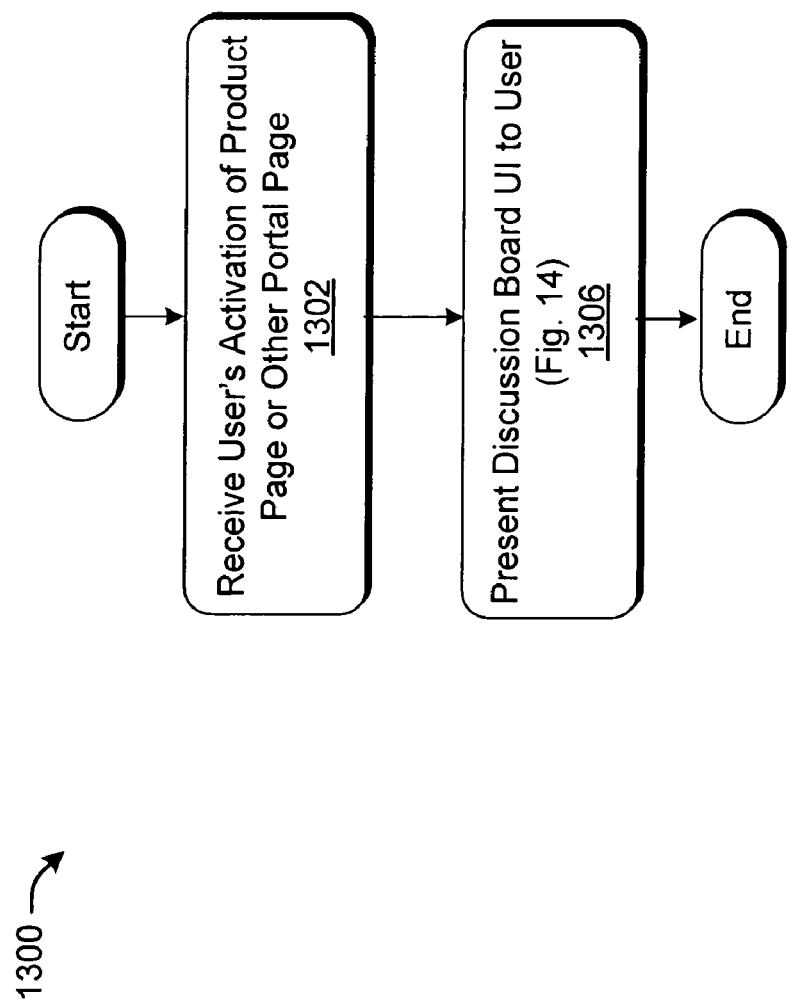

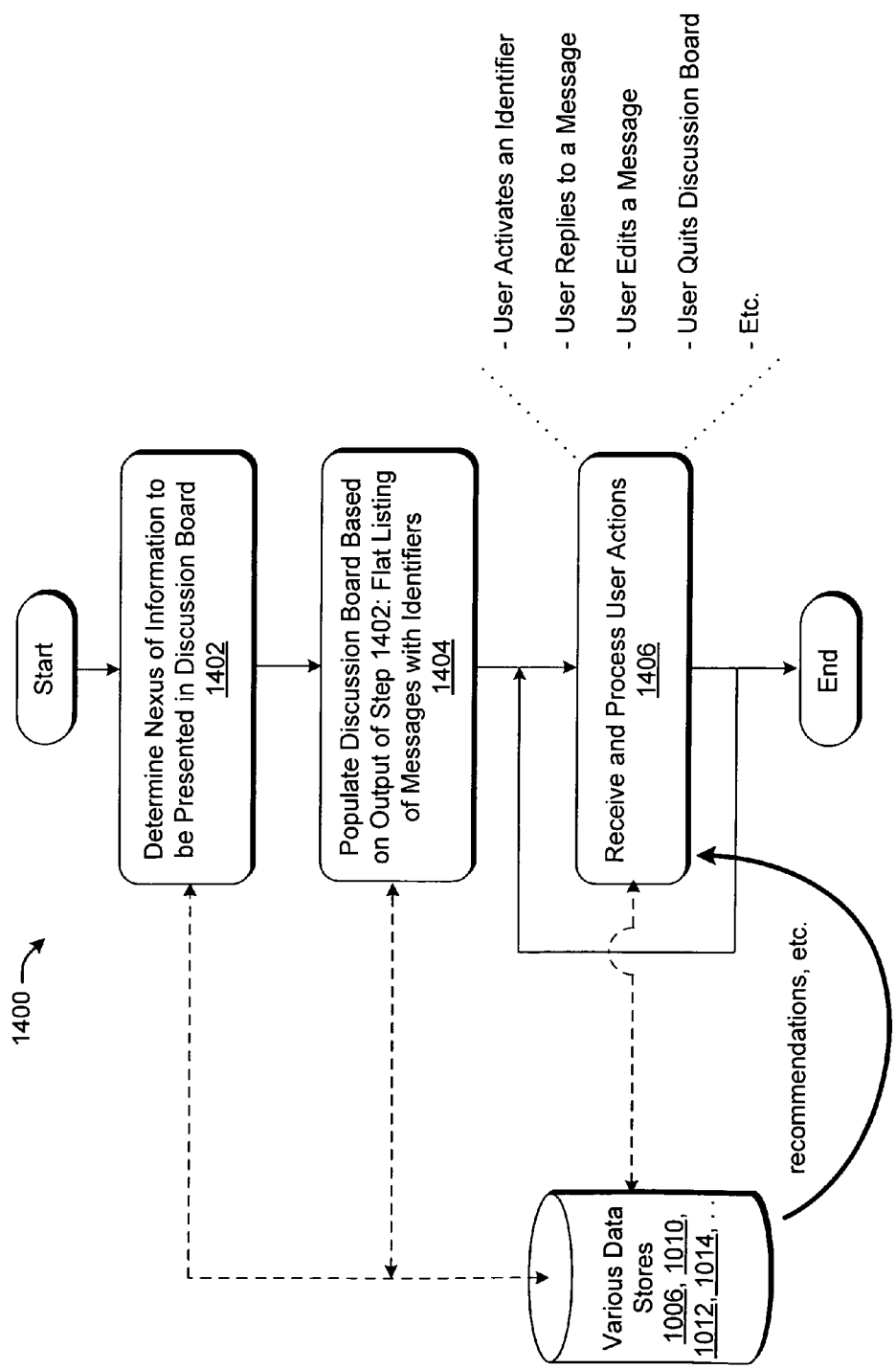

STRATEGIES FOR PRESENTING A SEQUENCE OF MESSAGES TO A USER

TECHNICAL FIELD

This subject matter generally relates to strategies for presenting a series of messages to a user. In a more particular exemplary implementation, this subject matter relates to strategies for presenting an online discussion board or like messaging mechanism to the user.

BACKGROUND

The Internet has fostered the growth of many new forms of communication. One of the most popular forms of communication is the so-called discussion board. A discussion board provides an online forum that allows users to view messages posted by other users and to respond to selected messages. A discussion board will commonly cater to a specific theme, which may be relatively broad or quite narrow. For instance, discussion boards have been created to discuss politics, child care, music, television shows, technical matters, products of various kinds, and so on.

FIGS. 1 and 2 show two well-known paradigms for organizing messages in a discussion board. Beginning with FIG. 1, this figure shows a presentation 100 that organizes messages using a so-called "flat" listing paradigm. Namely, this presentation 100 shows an exemplary seven messages (102-114) arranged in chronological order based on the times that the respective messages (102-114) were posted. That is, message 102 was posted first, followed by message 104, followed by message 106, and so on. Each message includes a message portion that identifies the text of the message. For instance, the first message 102 includes a message portion 116. Each message can also include a metadata portion which conveys salient information pertaining to the message. For instance, the first message includes a metadata portion 118 that identifies the user who posted the message 102, as well as the date and time at which the user posted the message. In the exemplary case of FIG. 1, the overall discussion is directed to a literature-related theme; namely, the discussion focuses on the New York Times list of best-selling books, as identified by theme caption 120.

The flat method of organizing messages has merit in that the user can quickly grasp the chronological flow of the conversation by scanning the discussion from top to bottom. For example, the last posting in the discussion identifies the most recent comment. However, this paradigm is not without its drawbacks. For example, a user may scan the chronological list of messages and choose to reply to a posting that is not the most recent posting. This may be problematic because it may generate a thematic discontinuity in the thread of messages. Consider, for example, the case in FIG. 1 in which the general topic pertains to a book written by a hypothetical author, John Smith. The first four messages (102-108) develop in a rather logical progression, with each user replying to an immediately preceding posting. However, the discussion becomes disjointed thereafter, with subsequent users choosing to reply to earlier messages in the sequence. Indeed, for example, the last user posts a message (i.e., message 114) that responds to a rather off-topic theme in response to a message (i.e., message 108) in the middle the sequence. This creates potential confusion, as a casual glance at the sequence does not immediately reveal the nexus between the last message and the other messages in the sequence.

FIG. 2 shows a presentation 200 that organizes messages using a so-called "nested" listing paradigm. Namely, this presentation 200 illustrates the same exemplary seven messages (102-114) as shown in FIG. 1, but arranges these messages in a manner which more clearly illustrates the nexus among messages. More specifically, in the nested paradigm, a message that is in reply to an earlier message is indented beneath that earlier message. For example, message 104 is in response to message 102, and is therefore indented beneath message 102. Message 106 is in response to message 104, and is therefore indented under message 104, and so on. This strategy overcomes the difficulty in the flat paradigm of FIG. 1, because it more clearly conveys the logical progression of messages. For example, the off-topic message 114 posted by the last user is now positioned directly beneath the message 108 it is in reply to, eliminating the confusion in the flat paradigm as to why this seemingly aberrant message was posted in the context of a discussion regarding a book.

Nevertheless, the nested paradigm is not without its own drawbacks. To better convey the relationships among messages, the nested view potentially presents messages out of chronological order. The thread of messages may therefore not readily convey a general sense of the chronological flow of the conversation, or easily convey earliest or most recent messages posted. Moreover, a thread that is highly nested may include many levels of indentations. This may create a difficult and unpleasant reading experience. Further, in practice the user may have difficulty visually tracing the indented layout to determine or following the relationship among messages.

Other alternative user interface paradigms have been proposed. However, these paradigms are also not fully satisfactory for one or more reasons.

For at least the above-identified reasons, there is a need for more satisfactory strategies for presenting messages to users.

SUMMARY

Functionality is described herein for presenting a chronological sequence of messages to the user. The functionality additionally annotates the messages with identifiers. Some of the identifiers convey the manner in which the identified messages relate to other messages in the sequence. The functionality therefore uniquely combines the merits of both a flat paradigm for organizing messages (by virtue of the arrangement of the messages in chronological order) and the nested paradigm for organizing messages (by virtue of the linking identifiers added to the messages).

According to another exemplary feature, the functionality can add an identifier to a subject message which, upon activation, invokes the presentation of another message which has some relationship to the subject message. The functionality can present such other message in a pop-up display panel or other kind of presentation.

According to another exemplary feature, the functionality can add an identifier to a subject message which invokes the presentation of other kinds of supplemental information, such as item-related information. Thus, for example, if the subject message mentions a certain item, this message can be annotated with an identifier which invokes the presentation of supplemental information related to this item. For instance, the supplemental information may comprise a series of recommendations having a bearing on the item mentioned in the subject message, or having some other bearing on the text content of the subject message. The functionality can present such supplemental information in a pop-up display panel or other kind of presentation.

According to another exemplary feature, the functionality can customize the sequence of messages to emphasize messages that may be of particular interest to a user interacting with the sequence of messages. For instance, the functionality can add special identifiers that identify messages posted by the user, messages that are in response to messages posted by the user, messages that the user has responded to, and so forth.

According to another exemplary feature, the functionality can annotate the message sequence with recommendations and other information items that are specifically tailored to reflect the prior online behavior of the user and/or a collection of users. The behavior is potentially indicative of the user(s) interest in items. For instance, the functionality can present a recommendation to the user based on an assessment, derived from the user's prior online behavior, that the user is interested in a certain item. The functionality can also make recommendations which rely on behavioral trends exhibited by a collection of users. Online behavior can be gauged by various user actions, such as, in one non-limiting case, the purchase of items.

According to another exemplary feature, the sequence of messages can be integrated with a merchandising system which presents information regarding a collection of items for possible purchase.

Additional exemplary implementations and attendant benefits are described in the following.

BRIEF DESCRIPTION OF THE DRAWINGS

FIG. 1 shows a known flat-type paradigm for organizing messages in a discussion board, as applied to a hypothetical collection of messages.

FIG. 4 shows an exemplary discussion board presentation that can be invoked by the item-related user interface presentation of FIG. 3, including a chronological sequence of annotated messages.

FIGS. 5 and 6 show exemplary behavior of the discussion board presentation of FIG. 4 upon the user's activation of identifiers associated with messages in the sequence.

FIG. 8 shows an exemplary method for inline editing a message in the discussion board presentation of FIG. 4.

FIG. 13 shows an exemplary procedure for invoking a discussion board presentation.

FIG. 14 shows an exemplary procedure for presenting a discussion board presentation to a user and allowing the user to interact with the presentation.

Figure 2:
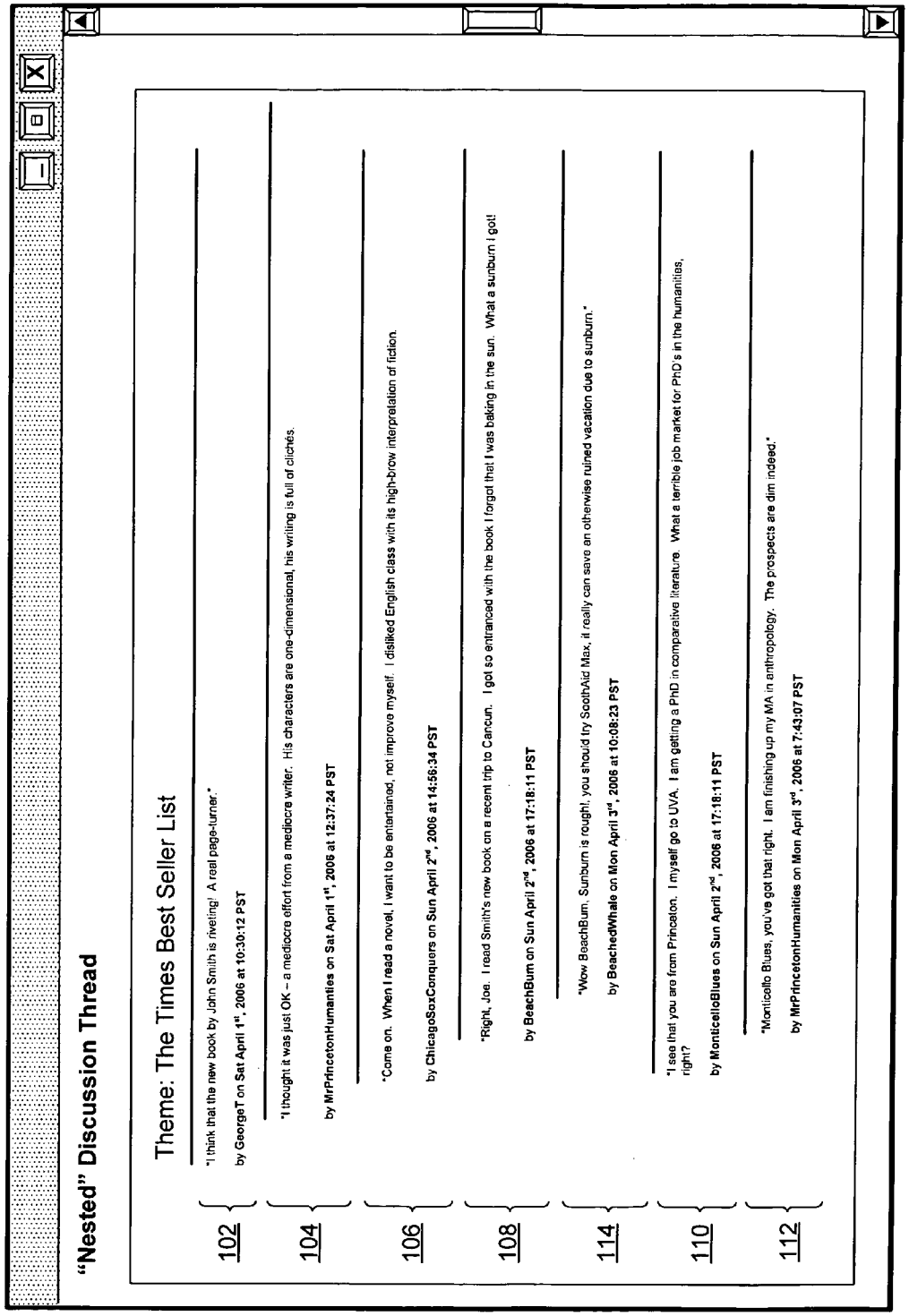
FIG. 2 shows a known nested-type paradigm for organizing messages in a discussion board, as applied to the hypothetical collection of messages introduced in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a messaging system that displays a chronological sequence of messages to the user. This aspect provides a "flat-like" characteristic of the system. At the same time, the messages are annotated with identifiers, some of which identify the relationship of the identified messages to other messages in the sequence. This aspect contributes to a "nested-like" characteristic of the system.

As used herein, the term "discussion board" refers to a particular forum for allowing contributors to engage in discussions. A discussion board can host multiple "discussion threads," also referred to as "discussions." Each discussion thread provides one or more messages, typically focused on an identified topic of conversation. Messages are also synonymously referred to herein as "message posts" or simply "posts." In a typical but non-limiting type of discussion board, the board is administered as a shared repository of messages. The entity or entities which administer the board are typically unaffiliated with the contributors to the board.

As used herein, the term "linking" has broad connation. It very generally refers to any kind of technology which associates one item of information with another item of information. It encompasses the use of any kind of pointer technology, mapping technology, hypertext linking technology, and so on.

The term "item" refers to any kind of discrete resource, such as any kind of tangible or intangible product (including informational resources), a service, and so forth.

The term "user activation" has broad connotation, to refer to events that occur in direct response to express user actions, e.g., mouse clicks, rollovers (in which the user moves a pointer via a mouse or other input mechanism over a user interface field), etc., and/or events that are only indirectly related to the user's actions (e.g., events based on the general context of the user's interaction with a user interface presentation, etc.), and so on.

The term "identifier" represents any kind of information that can be used to annotate a message. In one case, an identifier can be invoked to supply supplemental information. In another case, the identifier conveys, in itself, the supplemental information.

The terms "machine-readable media" or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one site to another.

To facilitate explanation, this disclosure describes the inventive features primarily in the context of a discussion board, as described above. However, the principles described herein are also applicable to other types of communication systems which present messages. A non-exhaustive and non-limiting list of other kinds of technology that can benefit from the principles described herein include blog technology, instant messaging (IM) technology, newsgroups, any kind of collaborative editing technology (such as "Wiki" technology), Email technology, any kind of comment thread technology (e.g., in the context of comments on book reviews or product reviews, etc.), collaborative indexing and cataloging technology, and so forth.

This disclosure includes the following sections. Section A describes the exemplary appearance and behavior of user interface presentations that employ an annotated sequence of messages. Section B presents an exemplary system for implementing the user interface presentations of Section A. And Section C describes the operation of the system of Section A in flowchart form.

A. Exemplary User Interface Presentations and their Behavior (FIGS. 3-8)

FIGS. 3-8 show exemplary user interface presentations that can be used to present an annotated chronological sequence of messages according to the present invention. The discussion board presentations are explained in the context of the same series of messages introduced in the context of FIGS. 1 and 2. The reader will appreciate that the content of this series of messages is merely illustrative.

A.1. Functionality for Invoking the Discussion Thread

Figure 3:
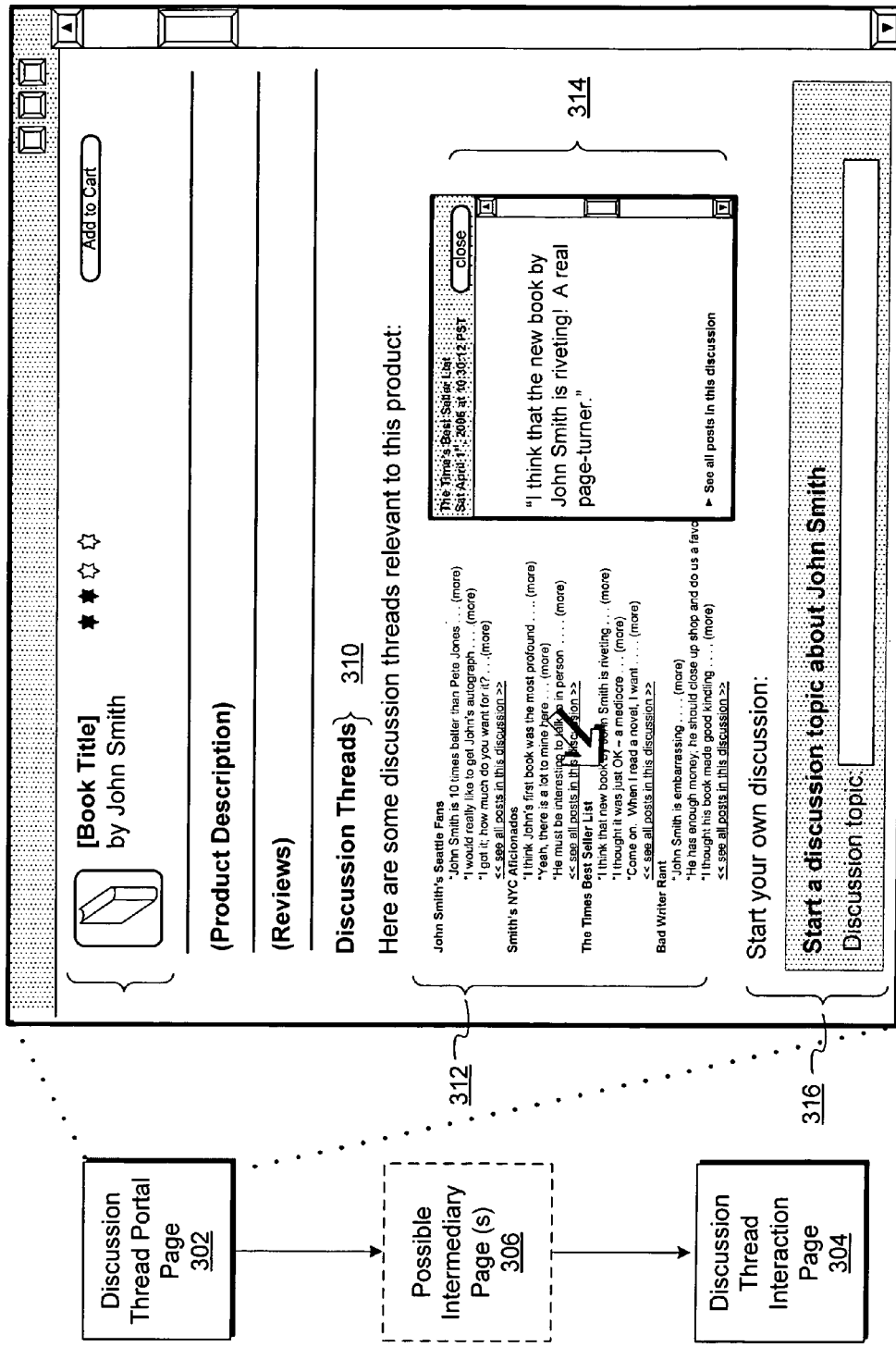
FIG. 3 shows an exemplary item-related user interface presentation for invoking a discussion board presentation according to the present invention.

To begin with, FIG. 3 shows one of many different ways that a discussion board thread can be invoked within a particular discussion board (forum). Although not shown, a similar technique can be used to invoke one or more entirely different discussion boards (e.g., discussion forums).

As summarized in the chain of blocks on the left-hand portion of FIG. 3, one or more introductory or portal user interface presentations 302 can be used to invoke a discussion thread presentation 304. Alternatively, in order to reach the discussion thread presentation 304, the user may be prompted to advance through one or more intermediary user interface presentations 306.

FIG. 3 shows an exemplary introductory user interface presentation 308. This user interface presentation 308 corresponds to an item display page provided by an online merchant. Namely, in this hypothetical case, the user interface presentation 308 shows information regarding a novel by a fictional author, John Smith, which can be purchased by the user through the services provided by the online merchant. This user interface presentation 308, in turn, can be reached in response to the user's input of one or more key terms, the user's selection of an entry in catalogue listing of items, and so forth. The user interface presentation 308 can include various well known types of fields, such as an item description section which provides salient information regarding the item, a review section which provides reviews associated with the item, and so forth.

In addition, the user interface presentation 308 can uniquely include a section 310 which provides a portal to one or more discussion threads. These discussion threads are selected because they all pertain in some way to the item under consideration, namely the book by John Smith. The nexus between an item and related discussion threads can be determined in various ways, such as by searching a collection of discussion threads for the key term "John Smith" (or some other relevant key term).

More specifically, section 310 includes a subsection 312 that identifies four exemplary threads of discussions that are active in a discussion board. They include: a discussion thread entitled "John Smith's Seattle Fans"; a discussion entitled "Smith's NYC Aficionados"; a discussion thread entitled "The Times Best Seller List"; and a discussion entitled "Bad Writer Rant." This subsection 312 also provides an abbreviated example of a sampling of the messages that appear in each of these discussion threads. For instance, in FIG. 3, each discussion thread in subsection 312 displays the first line of the first three messages in the discussion thread. Moreover, the user can explore any of the abbreviated messages from the sampling of messages in further detail by moving his or her mouse cursor (or like navigation mechanism) over one of the displayed messages. This prompts the presentation of a display panel 314. The display panel 314 provides the full text of the message that the user has selected via rollover. The use of the display panel 314 allows the user to gain a better understanding of what is being discussed in the discussion thread prior to formally committing to entering the discussion thread.

The section 310 can also include another subsection 316. This subsection 316 allows the user to start a new discussion thread regarding the item in question, the identified book by John Smith.

Assume for the purposes of illustration that the user activates the discussion thread entitled "The Times Best Seller List." This action invokes the display of the discussion board presentation 400 shown in FIG. 4.

As stated above, the same approach can be used to select entirely different discussion boards (forums). In this case, the user can access a desired discussion thread through a tiered access approach, where the user first accesses a desired discussion board, and then accesses a desired discussion thread within the discussion board.

A.2. Overview of an Exemplary Discussion Board Presentation

The discussion board presentation 400 of FIG. 4 contains an exemplary series of messages (402-414) arranged in chronological order, forming a particular discussion thread. More specifically, the series of messages (402-414) can potentially comprise a small subset of a larger body of messages, comprising the complete discussion thread. The user may access other parts of the discussion thread (not shown) by activating a "next page" (or "previous page") command, or the equivalent. Other possible page navigation commands (not shown) may allow the user to advance to the first page of the thread or the last page of the thread, and so on. To facilitate explanation, the discussion thread will be described mainly in the context of the exemplary series of messages (402-414).

The messages (402-414) are arranged in chronological order in the sense that the first message 402 is posted prior to the second message 404, and the second message 404 is posted prior to the third message 406, and so on. This strategy therefore adopts a "flat" listing organization of messages. However, the messages in FIG. 4 also include special annotations. Some of these annotations convey the manner in which annotated messages are related to other messages in the discussion board. By virtue of these annotations, the discussion board presentation 400 also conveys the nested relationship among messages. Accordingly, the user interface presentation 400 shown in FIG. 4 uniquely combines the features of both the flat manner of organizing messages and the nested manner of organizing messages.

More specifically, consider the exemplary second message 404. Among various conventional portions, this message 404 includes a message portion 416. The message 404 also includes a "reply" field 418 that can be activated to allow the user to reply to this message 404. This message 404 also includes an author field 420 that identifies the author who posted this message 404. Further still, this message 404 includes a time field 422 that identifies when the author (the fictional "MrPrincetonHumanities") posted the message 404.

In addition to the above fields, the message 404 uniquely includes two identifiers which identify how this message 404 is related in the sequence to other messages in the sequence. For example, an "In reply to" identifier 424 serves as a link which points to the message which message 404 is in reply to. In this case, this identifier points to first message 402. Further, a "You replied to" identifier 426 identifies a message entered by the user in response to the message 404. In the entirely exemplary case of FIG. 4, the user who happens to be interacting with the discussion board presentation 400 is the hypothetical user "MonticelloBlues" (which can be determined based on this user's sign-in information used to gain access to the discussion board presentation 400, or by some other identification mechanism). Thus, the "You replied to" identifier 426 points to message 410, which MonticelloBlues entered in response to the message 404, posted by MrPrincetonHumanities. As will be explained in greater depth shortly, activation of any one of these identifiers (424, 426) will invoke the display of the messages that are linked to these identifiers. Namely, activation of the identifier 424 will invoke a display of message 402, and activation of identifier 424 will invoke a display of message 410.

In general, the series of chronological messages (402-414) defines a data structure. The data structure comprises a collection of message portions, where each message portion provides message content and one or more associated identifiers. Each identifier forms a subportion within the message portion. In one exemplary and non-limiting implementation, the identifier subportions are integrated with the message portions, such that the messages and identifiers form an integral presentation.

By virtue of the use of linking identifiers, the user can quickly determine the relationship among messages in the chronological sequence of messages. For example, the user can quickly understand that the aberrant message 414 is in response to the mid-sequence message 408. At the same time, the use of the identifiers is unobtrusive. The user has the option of activating the identifiers (e.g., via mouse-over) to produce the resultant display panels, and the user can easily remove the resultant display panels. So the chronological presentation of messages is seeded with metadata that conveys the hierarchical relationship of messages in a manner that does not clutter the presentation or impede comprehension of the thread of messages.

Another advantageous feature of the discussion board presentation 400 is its customization of the sequence of messages to suit the user who is currently interacting with the discussion board. Namely, the discussion board presentation 400 highlights those messages that have a particular bearing on the user, MonticelloBlues. These messages include, for instance, messages that MonticelloBlues posted, messages that MonticelloBlues has responded to, and messages that other users have posted in response to messages by MonticelloBlues. For example, an identifier 428 identifies the message 410 that was posted by the user MonticielloBlues. The identifier 426, as explained above, identifies the message 404 that the user, MonticelloBlues, responded to. An identifier 430 identifies a message 412 that someone else, MrPrincetonHumanities, entered in response to a message by the user. By virtue of the user customization, the user's attention can be quickly directed to those messages that are most likely to interest the user. This feature further has the potential of improving user experience by making the discussion board presentation 402 easier to understand.

To summarize the discussion of FIG. 4 thus far, the following exemplary and non-limiting message-related identifiers can be used to annotate the user interface presentation of FIG. 4:

In reply to: this identifier annotates a subject message to identify (e.g., to point to) what message the subject message is in response to;

Replied to you: this identifier annotates a subject message to identify the message as one that was posted in response to a message from the user;

Your post: this identifier annotates a subject message to identify the message as the user's own posting;

You replied on: this identifier annotates a subject message to identify this message as a message that the user responded to, and to identify the user's reply message; and Replies to this message: this identifier annotates a subject message to identify the messages posted by users that responded to the subject message.

Last edited on: this identifier annotates a subject message to identify the date on which the subject message was last edited.

It should be noted that, in the simplified context of FIG. 4, most of the messages are related to other messages presented on a single display page. However, in a more general context, a source message can include an identifier which links to a target message that is presented on another page (and is therefore not presently visible to the user). Activation of such an identifier can invoke the presentation of the target message, such that the source message and the target message are concurrently displayed (that is, displayed at the same time in one or more display panels). This provision is particularly convenient, as it supplies the user with the content of the target message without requiring the user to change their present focus within the thread.

For example, in FIG. 4, note that message 414 includes a "You replied to" identifier 432 which links to a message that is present on a later page (not shown). Activating this identifier 432 will prompt the functionality to present the content of the related message in the context of the page view shown in FIG. 4, that is, without requiring the user to remove their focus on message 414.

Further, in the examples above, messages are related to other messages in the context of a reply-related nexus. However, in other cases, messages can be related to other messages based on other types of relationships. For instance, identifiers can be added which establish the relationship of messages among friends, family, individuals conversing on specific topics (e.g., as gleaned from keywords in the messages, etc.), and so on.

Additional information regarding exemplary behavior that is invoked upon the activation of identifiers is presented below.

A.3. Display Panel Presentation in Response to Invocation of Identifiers

Figure 6:
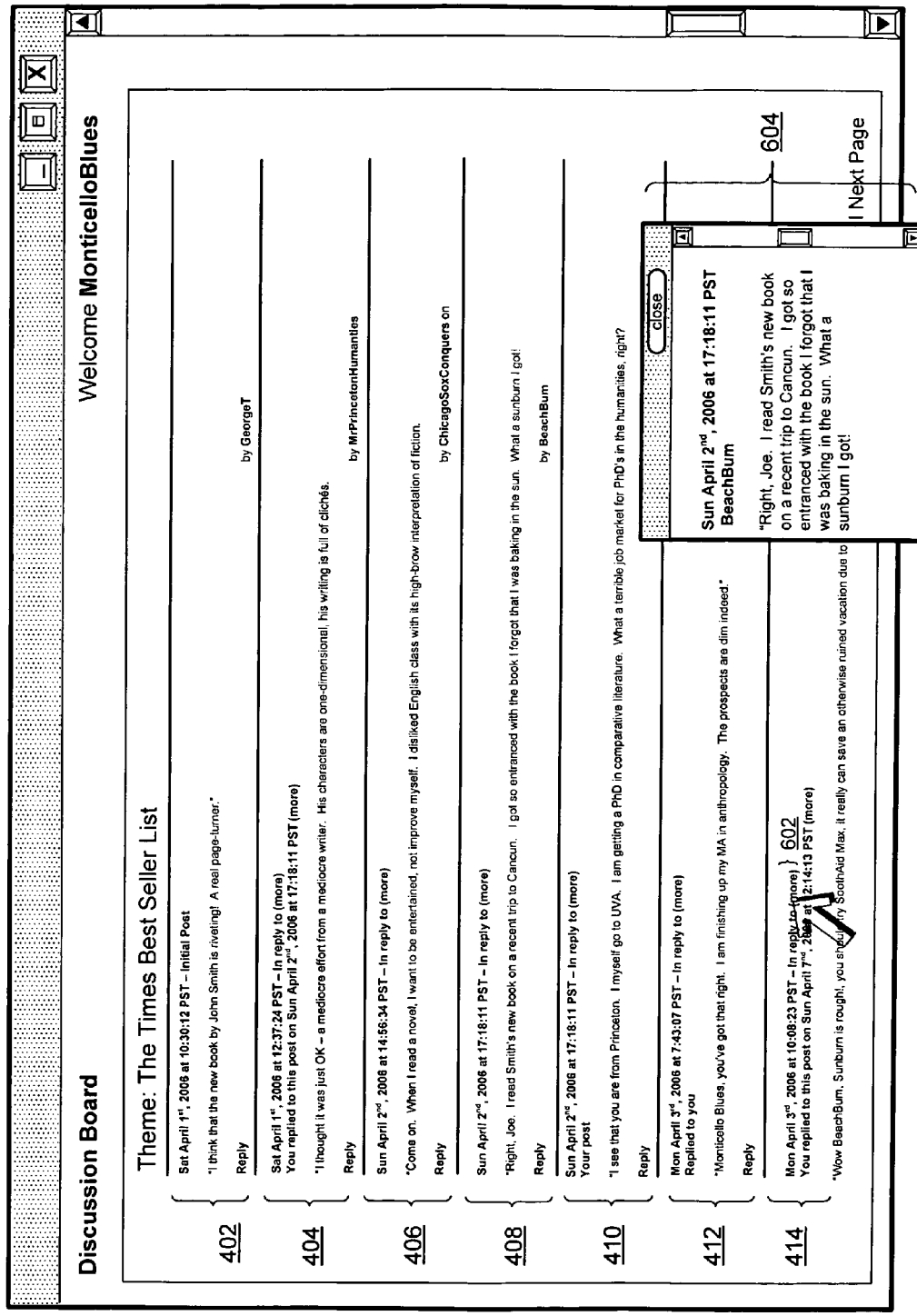

FIGS. 5 and 6 illustrate the behavior of the user interface presentation 400 when the user activates two of the linked identifiers. Namely, in the case of FIG. 5, the user has activated the "You replied to" identifier 426. This invokes the presentation of a display panel 502 which presents the message that the user, MonticelloBlues, entered in response to message 404. Namely, the display panel 502 presents the text of message 410. In the case of FIG. 6, the user has activated the "In reply to" identifier 602 of message 414. This invokes the presentation of a display panel 604 which identifies the message (i.e., message 408) that this message (i.e., message 414) is in reply to. In the illustrated case, the invoked messages (target messages) are displayed on the same page as the invoking messages (source messages); although, as stated above, the target messages can appear on other pages which are not currently being presented to the user.

According to one exemplary implementation, the display panels (502, 604) can be ephemeral presentations that will automatically appear when the user rolls a mouse cursor over the identifiers (426, 602), and will automatically disappear when the user moves the mouse cursor away from the identifiers (426, 602). Many other alternatives are possible, including:

- The rollover activation of the identifiers (426, 602) can automatically generate the display panels (502, 604). But to remove these panels (502, 604), the user must click a close command that appears on these panels (502, 604).
- The user activates the identifiers (426, 602) by expressly clicking on the identifiers (426, 602) (rather than merely rolling over the identifiers with the mouse cursor). The panels (502, 604) can be automatically removed when the user moves away from the identifiers (426, 602) or in response to express action taken by the user (e.g., by activating a close button).
- The activation of the identifiers (426, 602) (in any manner) invokes window-type presentations (not shown). This activating event can entirely redirect the user from the discussion board presentation 400 to the window-type presentations. For instance, the window-type presentations can fill the entire display screen. Deactivation of the window-type presentations returns the user to the discussion board presentation 400.
- The activation of the identifiers (426, 602) highlights the linked messages in the chronological sequences of messages, but otherwise does not present any kind of separate display panels or window-type presentations. For instance, activation of the identifiers (426, 602) can cause the linked messages to be displayed in a different color or format (bold, italicized, etc.), to flash, to change in size and/or background color, and so forth. Or activation of the identifiers (426, 602) can cause the presentation of arrows or other symbols which direct the user's attention to the linked messages. Animation can also be added to direct the user's attention to linked messages, such as by drawing a circle around the messages, by providing a gesturing character which "points" to the messages, and so on.

Still other implementations are possible. For instance, in one exemplary implementation, an activated display panel can itself include an additional link. Activation of this link can invoke the presentation of another linked message within another display panel. This secondary display panel can, in turn, include another link, which, when activated, can invoke the presentation of a tertiary display panel, and so on. Such a series of display panels can be cascaded on the display screen or displayed in any other manner. This kind of presentation can allow the user to progressively trace the course of a certain sequence of reply messages to its source (i.e., in response to the activation of a succession of "In reply to" identifiers) without leaving the original context of discussion.

As mentioned above, the term "activation" is to be construed liberally to encompass any way of invoking supplemental information, including express actions taken by a user (e.g., based on mouse clicks, rollovers, etc.), as well as indirect actions (e.g., based on the context of the user's interaction with the discussion board).

Moreover, the above techniques for displaying linked messages can also be used to display any other kind of supplemental information associated with an activated identifier. For instance, the author fields shown in the discussion board presentation 400 can include links which, when activated, invoke respective user profile displays (not shown) that provide information regarding the users who posted the messages.

A.4. Annotating the Presentation with Item-Related Information

Figure 7:
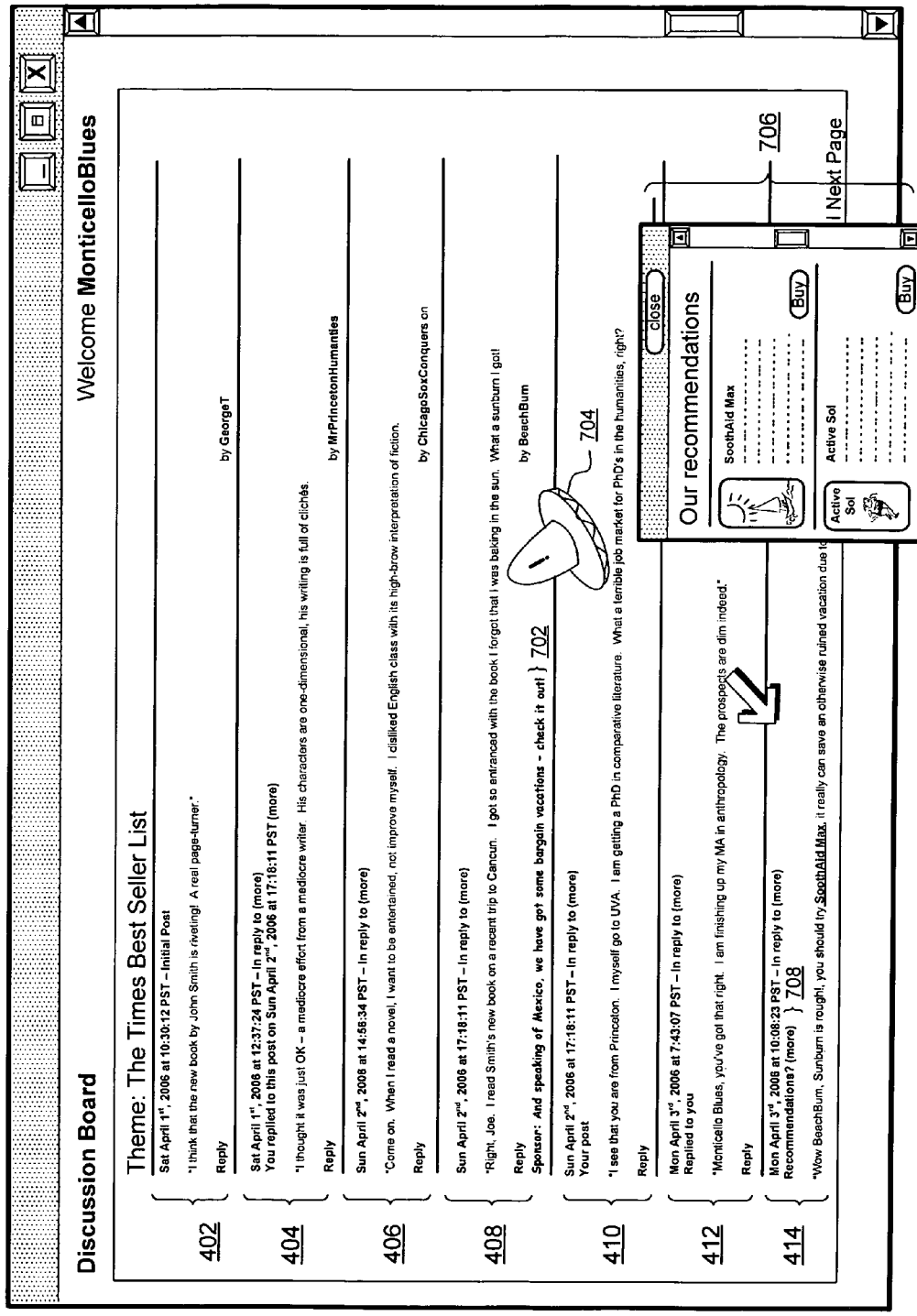
FIG. 7 shows an exemplary behavior of the discussion board presentation of FIG. 4 upon the user's activation of an item-related identifier associated with one of the messages in the sequence.

Advancing to FIG. 7, this figure shows a discussion board presentation 700 that is a variation of the discussion board presentation 400 of FIGS. 4-6. Namely, while this presentation 700 includes the same kinds of message-related annotations previously discussed, it also includes non-message-related annotations. As the name suggests, the non-message-related annotations do not serve a role in describing the relationship of messages to other messages or the authorship of messages. Rather, these messages link to any other kind of supplemental information that has a bearing on the messages.

In the specific case of FIG. 7, the supplemental information is item-related information. One exemplary mechanism by which such item-related information can be identified and applied to a discussion board is set forth below, with reference to the illustrative discussion board presentation 700.

In one case, the entity that sponsors and/or administers the discussion board presentation 700 is an online merchant. The online merchant sells goods or services (or more generally, "items") via a digital network, such as the Internet. In doing so, the online merchant maintains item-related data stores (that describe merchandise or services for purchase), transactional data stores (that define purchases and other online actions that have been made by users), and other kinds of business-related data stores. In operation, the online merchant can mine these data stores to extract supplemental information that has some bearing on the content being imparted by the discussion board presentation 700. The online merchant can then integrate this supplemental information into the discussion board presentation 700 by annotating the presentation 700 with various identifiers which provide (or which can be invoked to provide) the supplemental information. The objective of annotating the discussion with supplemental information may be commercial in nature—namely, to encourage the sale of goods or services—but it can also be purely informational, or it may serve yet some other objective.

More specifically, the online merchant can maintain a list of keywords. The keywords may correspond to item names, topics of interest to users, and so forth. The online merchant can scan each message as it is received, or periodically scan the discussion board as a whole, to determine whether it contains one or more registered keywords. If so, the online merchant can present supplemental information pertaining to the keywords, where such supplemental information is potentially extracted from the above-described data stores. This supplemental information can vary depending on the objectives of the merchant. In one case, the supplemental information may describe items that the user might be interested in purchasing, where the items have some relationship to one or more keywords that appear in the discussion board.

In one case, the online merchant can present identifiers which automatically populate the discussion board with the supplemental information, without involvement by the user. In another case, the online merchant can present identifiers which need to be invoked by the user in order to receive the supplemental information.

The specific examples which follow are illustrative of many ways that supplemental information can be identified and integrated into a discussion thread.

Consider first the case of message 408. In this message 408, although the user is engaged in a discussion of a book by the fictional author John Smith, the user mentions a vacation to Cancun. In this illustrative case, the word "Cancun" is a pre-registered keyword that automatically causes the online merchant to annotate the discussion board with an identifier

702. This identifier 702 invites the user to review further information regarding vacation packages to Mexico. The online merchant might also provide an eye-catching symbol or picture 704 to better direct the user's attention to this identifier 702.

Consider next the case of message 414. This message 414 responds to message 408. It mentions a certain item, a fictional sunburn lotion named SoothAid Max. In this case, the inclusion of this item name in the conversation thread prompts the discussion board presentation 700 to display a series of items that are related to the SoothAidMax item. That is, the identified items may include other suntan lotions, and may also include the item SoothAidMax itself.

More specifically, FIG. 7 shows that the online merchant can present the recommendations in a display panel 706. In one case, the discussion board presentation 700 automatically presents this display panel 706 upon the detection of the keyword "SoothAidMax." In another case, the discussion board presentation 700 presents the display panel 706 in response to a rollover event (in which the user moves a mouse cursor over a "Recommendation?" identifier 708). In another case, the discussion board presentation 700 presents the display panel 706 only when the user expressly clicks on the identifier 708. Still further permutations are possible.

The exemplary marketing rationale here is that, if the user is engaged in a discussion regarding a certain item, there is a chance that the user is interested in purchasing such an item or a related item. Here, the particular item (suntan lotion) is somewhat tangential to the reason that the user, MonticelloBlues, is probably taking part in the discussion, but one can readily envision examples in which the user is in a heated debate regarding the merits of some particular kind of merchandise, such as a music CD by a certain artist. In this case, seeding the discussion board presentation 700 with item recommendations may be highly effective in inducing the participants of the discussion to purchase items that are germane to the discussion.

The recommendations can also be specifically tailored for the user, in this case the user MonticelloBlues. For instance, the online merchant can maintain detailed records regarding purchases and other online selections made by the user, as well as other profile information regarding the user. Such other online selections can comprise click-through events, rollover events, shopping cart selections, item reviews posted by the user, wish list selections, and so on. More generally, all such activity captures the user's online behavior, much of which may be directed to interaction with one or more catalogues of merchandisable items. The online merchant can use this information as a guide to further refine the recommendations and other supplemental information given to the user. For example, assume that the user, MonticelloBlues, has purchased several DVDs. The online merchant can leverage this knowledge to present recommendations that invite this user to purchase a movie version of a book being discussed in the thread. As another example, assume that the user, MonticelloBlues, has purchased several books in the same genre as the book being discussed in the thread, but in a well-defined niche of that genre. The online merchant can leverage knowledge of the user's buying patterns to present recommendations (or other supplemental information) that is both based on what is being discussed in the discussion board and the interests of the user.

In another case, the online merchant can provide recommendations to the user based on the user's relationship to some other user or users, such as a family member or friend. The online merchant is alerted to such a relationship, for instance, when the user expressly notifies the online merchant of this relationship, or through some other means. In this scenario, the online merchant can assess the interests of the person that has some relationship to the user (in same manner described above, e.g., by mining transactional data stores maintained by the online merchant). The online merchant can then provide item recommendations to the user relating to that person's interests, thereby inviting the user to purchase a gift for that person. This form of marketing can be potentially particularly effective in those cases in which the user is engaged in a conversation with the other person in the discussion board, as the user is apparently already thinking of the other person (while reading their post) when the user is presented with an offer to purchase a gift for that person. If appropriate, the online merchant can even present recommended items that have some relationship to the content of the message posts authored by the other person.

In another case, the online merchant can provide recommendations to the user that are based on the assessed characteristics of the user (such as the past purchases made by the user or other online behavior) without regard to the content of the messages in the discussion board.

More generally, recommendations can be based any number of considerations, such as: (a) any prior behavior of the user that is indicative of the user's interests; (b) the collective prior behavior of many users that is indicative of certain trends in these users' interests; (c) the characteristics of the user (e.g., gender, age, geographic location, etc.), and so on. The behavior can be collected over multiple user sessions, thus, for instance, forming estimates of a user's interests over an extended period of time.

In one exemplary and non-limiting implementation, recommendations can be generated using the techniques described in U.S. Pat. Nos. 6,266,649 and 6,853,982. In these techniques, a user who is known to be interested in item X is assumed to be interested in item Y if a significant number of users who have an interest in item X are determined to also have an interest in item Y. Thus, in the context of a discussion board, if the message content identifies the product X, then the recommendation engine can provide an identifier which provides a link to the product Y. Various filters, neural networks, rule-based engines, heuristics, experts systems, and so forth can be used to further refine the analysis used to generate recommendations. To cite one example, more advanced analysis can be used to detect the general theme of a discussion thread, so that only items that are germane to the general theme are presented. This model might preclude the kind of tangential recommendations shown in FIG. 7, where the identified item is not relevant to the main thrust of the conversation.

In another exemplary implementation, users can explicitly define identifiers when they create their respective messages. For instance, when creating a post, a user can add an identifier which links to any kind of supplemental information, such as an item-related recommendation sponsored by the online merchant that hosts the discussion board, or another recommendation administered by the user himself/herself. For instance, a user can add an identifier which links to the user's own website.

A.5. Functionality for Editing and Replying

Advancing to FIG. 8, this figure shows a discussion board presentation 800 that is still another variation of the user interface presentation 400 discussed above. In this presentation 800, an inline editing tool 802 is presented which allows the user, MonticelloBlues, to edit his or her message 410. The tool 802 is inline because it appears in the sequence of messages in which the message 410 normally appears. The tool 802 includes commands that allow the user to delete the post, cancel the post, or to post the edited reply.

Although not shown, a similar tool can be used by the user to enter a completely new message, e.g., in response to another message. After the user enters a new post, the new post is placed at the end of the chronological sequence.

B. Exemplary Systems (FIGS. 9-12)

In the following section, the terms "logic", "module" or "functionality" generally represent hardware, software or a combination of hardware and software, or any other kind of implementation. For instance, in the case of a software implementation, the terms "logic," "module," or "functionality" represent program code that performs specified tasks when executed on a processing device or devices (e.g., CPU or CPUs). The program code can be stored in one or more computer readable memory devices.

B.1. System Overview

Figure 9:
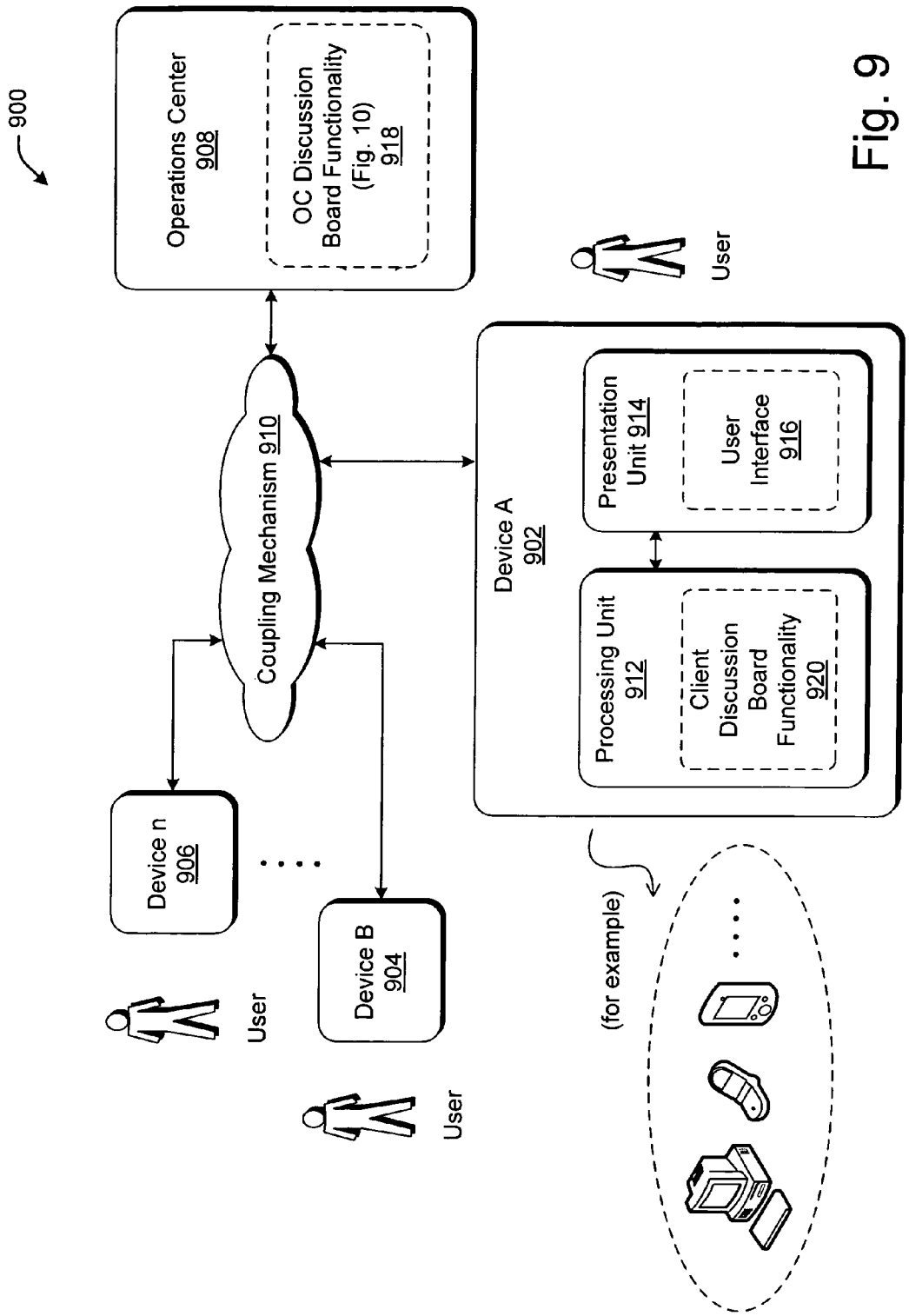
FIG. 9 shows an exemplary system for implementing the user interface features illustrated in FIGS. 3-8.

FIG. 9 shows an overview of one particular online system 900 for implementing the user interface features described in the previous sections. In this system 900, a plurality of devices (902, 904, ... 906) are coupled to an operations center 908 by a coupling mechanism 910. A plurality of users use the respective devices (902, 904, ... 906) to interact with the operations center 908.

The operations center 908 can generally represent equipment maintained by an online merchant, although the principles described herein can be implemented by any other kind of commercial or non-commercial entity. In terms of physical implementation, the operations center 908 can be implemented as one or more server computers (e.g., as a "farm" of such computer servers) and associated databases. In conventional manner, the architecture of the operations center 908 can be separated into front-end components which interface directly with the devices (902, 904, ... 906) and back-end components which can perform offline analysis. Generally, the components of operations center 908 can be located at a single site, or distributed over plural sites.

The devices (902, 904, ... 906) can represent any kind of electronic unit which can interact with the operations center 908 via the coupling mechanism 910. In the most common case, the devices (902, 904, ... 906) correspond to some kind of conventional computer device, such as a personal computer, a laptop computer, and so forth. But any of the devices (902, 904, ... 906) can also correspond to any kind of wearable computer, a mobile telephone, a Personal Digital Assistant (PDA) device, a stylus-type input device, a game console device, and so forth. In any event, a device, such as exemplary device 902, can comprise a processing unit 912 and a presentation unit 914. The processing unit 912 generally comprises functionality for processing information. The presentation unit 914 generally corresponds to functionality for presenting the processed information and additionally allows the user to interact with the device 902. The presentation unit 914 can provide a graphical user interface 916 for interacting with the user.

The coupling mechanism 910 can correspond to any kind of communication conduit or combination of communication conduits. In the case most commonly evoked in this disclosure, the coupling mechanism 910 corresponds to a wide area network, such as the Internet. However, the coupling mechanism 910 can alternatively, or in addition, comprise other kinds of communication conduits, such as an intranet, point-to-point coupling arrangement, and so forth. In any case, the coupling mechanism 910 can include any combination of hardwired links, wireless links, routers, repeaters, gateways, name servers, and so forth (not shown), governed by a protocol or combination of protocols.

The discussion board presentation features described in the previous section can be implemented by a combination of functionality provided at the operations center 908 and functionality provided at the devices (902, 904, ... 906). Namely, to serve this role, the operations center 908 includes an operations center (OC) discussion board functionality 918, while the device 902 includes client discussion board functionality 920. As will be discussed below, the OC discussion board functionality 918 can administer the discussion boards by storing messages that have been posted by users, and by disseminating annotated messages to the devices (902, 904, ... 906) in response to user requests. These messages populate the discussion boards. The client discussion board functionality 920 can handle various local aspects of the operation of the discussion board (for device 902), such as by executing, based on local code, the rollover behavior shown in FIGS. 5 and 6, etc.

B.2. Exemplary Operations Center

Figure 10:
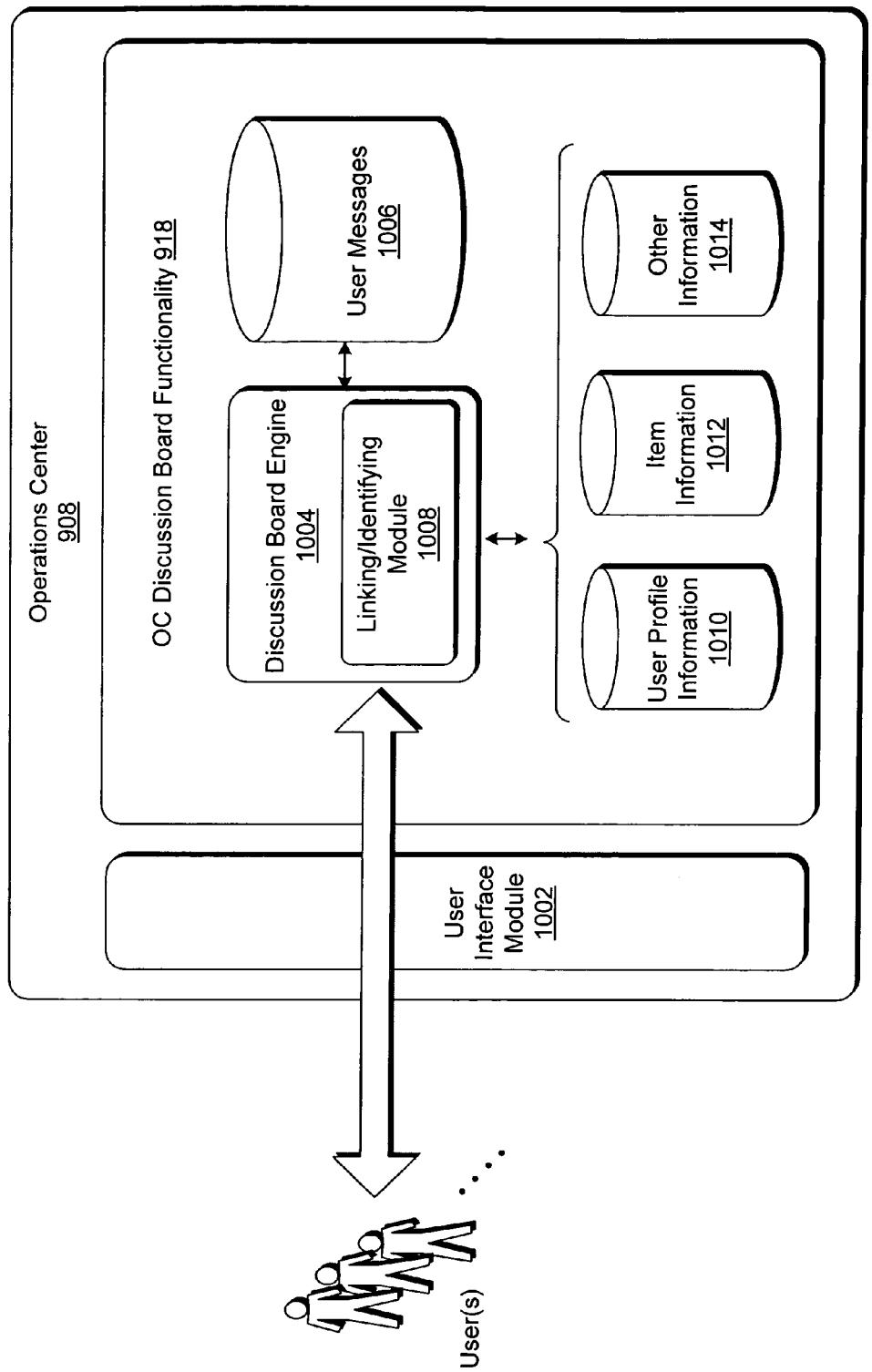
FIG. 10 shows the architecture of an exemplary operations center for use in the system of FIG. 9.

FIG. 10 shows exemplary features of the operations center 908. It will be appreciated that the operations center 908 performs many functions, only a subset of which are relevant to the generation and administration of discussion boards. Hence, FIG. 10 shows only those components of the operations center 908 which are pertinent to the focus of this disclosure.

The operations center 908 includes a user interface module 1002 for receiving selections from the users, and for generating output to the users. For instance, the input may comprise requests by the user to view certain discussion boards, requests to post new messages, requests to edit messages, and so forth. The output comprises the data used, in conjunction with the client discussion board functionality 920, to construct the user interface presentations described in the preceding section. The interface module 1002 interacts with the OC discussion board functionality 918.

The OC discussion board functionality 918 includes a discussion board engine 1004 that performs the main task of storing messages in a user message store 1006, and for retrieving messages from this store 1006 for output to users. The discussion board engine 1004 also includes a linking/identifying module 1008. The purpose of this module 1008 is to define the relationships among different messages in the discussion board presentation, and to establish the identifiers that implement these relationships. The linking/identifying module 1008 also serves to relate messages in the discussion board presentation with other supplemental information, such as item-related information, and to establish the identifiers that implement these relationships. The linking/identifying module 1008 also serves to customize the discussion board presentation for use by a particular user who will interact with the presentation; it does this by annotating the presentation with identifiers that are specifically tailored to the user. The linking/identifying module 1008 can determine the identity of the user by virtue of sign-in ID information that the user enters to gain access to the discussion board presentation or some other application, or by using some other kind of identification mechanism.

To perform the above-described roles, the linking/identifying module 1008 can draw on a number of data stores maintained by the operations center 908, including a user profile store 1010, an item information store 1012, and various other potential stores 1014 not mentioned by name. The user profile store 1010 maintains information regarding the users, such as any aspect of the users' online behavior (including purchases made by the users, shopping cart selections, page view selections, etc.), other user characteristics (gender, age, geographic location, etc.), and so on. The item information store 1012 provides catalogue information regarding a plurality of items merchandised through the system 900. Each of the data stores can be implemented as a database, as a single repository of information or multiple distributed repositories of information.

Figure 11:
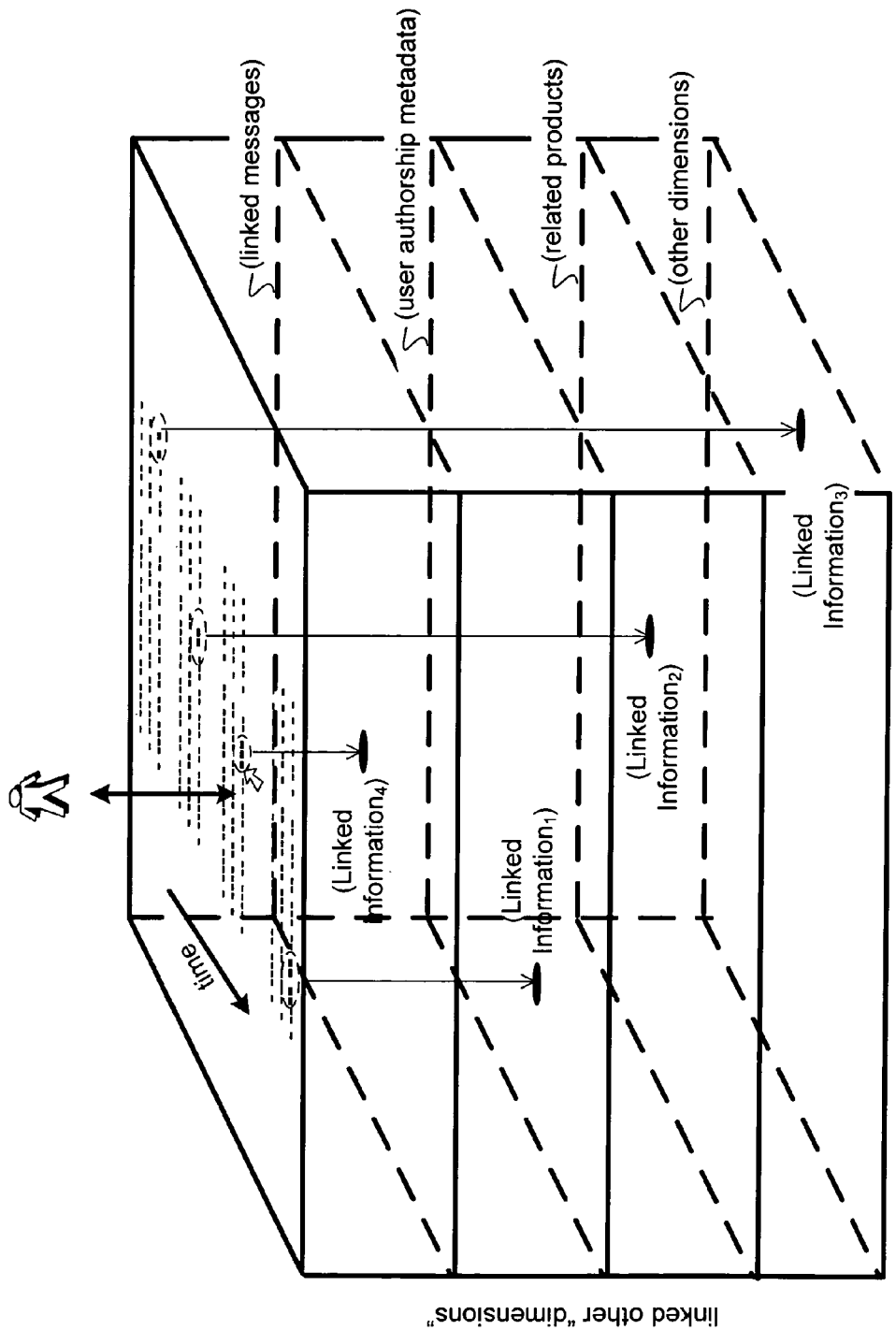
FIG. 11 is a high-level conceptual diagram which illustrates the manner of operation of a linking/identifying module used within the operations center of FIG. 10.

FIG. 11 illustrates, on a high-level conceptual basis, the operation of the linking/identifying module 1008. As indicated there, in response to a request from a user, the discussion board engine 1004 retrieves a plurality of messages from the message store 1006 and arranges these messages in chronological order for presentation to the user. In FIG. 11, the chronological presentation of messages is metaphorically represented by the top surface of a multi-layer "cube," having one axis corresponding to time. This "surface" of the conversation is the dimension that is most readily "visible" to the user.

The linking/identifying module 1008 establishes links between the messages on the top "surface" of the conversation and supplemental information. Some of these links point to other messages in the sequence of messages (as in the "In reply to" and "You replied on" identifiers). Other of these links point to non-message-related information, such as item information, user profile information, and so forth. In any event, the linking can be viewed as metaphorically connecting the "surface" of the conversation with various other layers of the conversation that may not be immediately "visible" to the user. The user can optionally invoke these other layers. Due to the optional nature of the activation strategy, the other layers do not clutter and obfuscate the otherwise straightforward presentation of a chronological sequence of messages.

B.3. Exemplary Client Device

Figure 12:
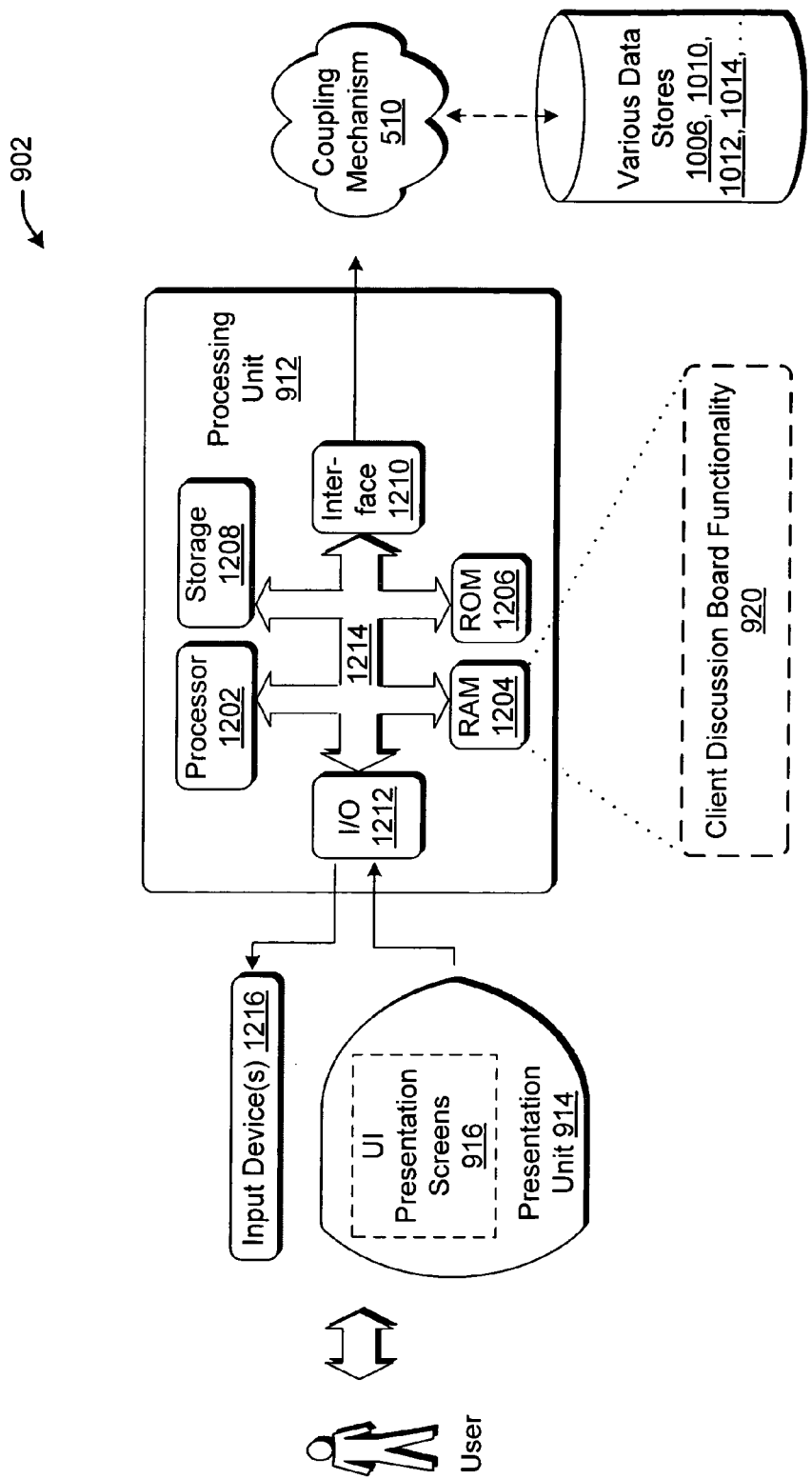
FIG. 12 shows the architecture of an exemplary client device for use in the system of FIG. 9.

FIG. 12 shows an exemplary architecture of the representative user device 902 (introduced in the context of FIG. 9). The device 902 can correspond to any kind of conventional computer device, but can also correspond to any other kind of unit having processing and presentation capabilities (e.g., a PDA device, mobile telephone, game console, and so forth).

The processing unit 912 of device 902 can comprise one or more processing components 1202 (such as a CPU, neural network, etc.), RAM 1204, ROM 1206, media components 1208 (such as a hard drive, DVD drive, etc.), network interface 1210 (such as a telephone or cable modem, broadband connectivity mechanism, etc.), and an I/O interface 1212 for interacting with input devices and output devices. One or more buses 1214 couple the above-described components together. The output devices can include the presentation unit 914, which presents the graphical user interface 916. The input devices 1216 can include any one or more of a keyboard, mouse input device, track ball input device, joystick input device, and so forth.

In one implementation, when the user requests any new information from the discussion board presentation, the client device 902 can request this information from the operations center 908. For instance, in this scenario, when the user activates the "You replied to" identifier 426 of FIG. 5, the client device 902 makes a request to the operations center 908 in order to display the display panel 502. In another implementation, the client device 902 can handle many user requests without contacting the operations center 908. For example, the client discussion board functionality 920 can initially download a collection of annotated messages in response to a request from the user to access the discussion board presentation. The client discussion board functionality 920 can provide logic which draws from this collection of data when the user makes a request that can be satisfied by this data, without requiring communication with the operations center 908.

In other words, for certain operations, the device 902's "serverless" interaction with the user is not prohibited, e.g., not blocked. For instance, in this design, the device 902 can present the display panel 502 when the user activates the identifier 426 without contacting the operations center 908, by locally relying on the previously received annotated message data and by invoking local logic used to draw the display panel 502. One exemplary technique for implementing this kind of non-blocking local control uses asynchronous JavaScript and XML.

C. Exemplary Procedures (FIGS. 13 and 14)

The remaining figures (FIGS. 13 and 14) describe the operation of the discussion board functionality (918, 920) in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. The steps shown in the flowcharts can be implemented by software, hardware, a combination of software and hardware, or by other technology, and can generally be implemented by a single module or any combination of modules. As the preceding sections have explained the subject matter imparted by FIGS. 13 and 14 at length, this section serves primarily as summary and review.

FIG. 13 shows a procedure 1300 for invoking the discussion board presentation.

In step 1302, the operations center 908 receives the user's invocation of a discussion board presentation. This invocation can be received via any kind of portal page or other mechanism, such as the product-related page 308 shown in FIG. 3.

In step 1304, the operations center 908 advances the user to the invoked discussion board presentation. This operation involves compiling and identifying a group of messages, and forwarding the thus-annotated messages to the user for display at the client device 902.

More specifically, FIG. 14 shows a procedure 1400 that describes the manner in which the discussion board presentation is compiled for the user, and the manner in which the user interacts with the presentation.

In step 1402, the operations center 908 establishes the messages to be presented to the user and establishes the links associated with the messages. The links point to other messages or other supplemental information (such as item-related information).

In step 1404, the operations center 908 formats the discussion board presentation for output to the user.

In step 1406, the operations center 908 processes user actions, in conjunction (optionally) with the client discussion board functionality 920. Possible user actions include, but are not limited to, the user's activation of linked identifiers, the user's reply to a message, the user's editing of a message, the user's termination of the discussion board session, and so forth. As described previously, activation of an identifier can prompt the retrieval of linked supplemental information, such as a linked message, item-related information, and so on. Recall that, with reference to FIG. 10, the messages can be stored in a user message data store 1006. In the case where the supplemental information represents recommendations, such recommendations can be mined from information in various stores (e.g., stores 1010, 1012, 1014) maintained by the online merchant or other entity(ies).

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method for presenting messages to a user, comprising:
   identifying a collection of messages from a plurality of contributors, the messages having:
      respective times associated therewith; and
      a hierarchical reply-related nexus in which at least one message is in reply to at least one other message;
   forming a sequence from the collection of messages, the sequence having:
      a chronological order based on the times associated with the messages and independent of the hierarchical reply-related nexus of the messages; and
      at least one textual identifier annotating a subject message, said at least one textual identifier integrated into the sequence, forming a part of the sequence, and conveying a relationship of the subject message in the sequence to at least one other message in the sequence;
   presenting the sequence to the user in a presentation having an order based on the chronological order;
   receiving an activation of said at least one textual identifier annotating the subject message; and
   at least partly in response to receiving the activation, presenting the at least one other message having the relationship to the subject message.

2. The method of claim 1, wherein the presenting the sequence comprises presenting the sequence in one or more of a discussion board or a blog.

3. The method of claim 1, wherein the presenting the sequence comprises presenting the sequence in a log of collaborative editing.

4. The method of claim 3, wherein the log of collaborative editing comprises a sequence of Wiki edits.

5. The method of claim 1, wherein the forming comprises forming the sequence using a shared repository administered by an entity which is unaffiliated with the plurality of contributors to the sequence.

6. The method of claim 1, wherein said at least one textual identifier identifies another message in the sequence that the subject message is in reply to.

7. The method of claim 1, wherein said at least one textual identifier identifies the subject message as a message to which the user has replied.

8. The method of claim 1, wherein the sequence of messages includes a textual identifier associated with the subject message, the textual identifier identifying the subject message as a message that is in response to one of the user's messages.

9. The method of claim 1, wherein the sequence of messages includes a textual identifier associated with the subject message, the textual identifier identifying the subject message as a message created by the user.

10. The method of claim 1, wherein the sequence of messages includes:
   (a) a first identifier associated with the subject message, the first identifier identifying the subject message as a message that is in response to one of the user's messages; and
   (b) a second identifier associated with the subject message, the second identifier identifying the subject message as a message created by the user;
   wherein at least one of the first identifier and the second identifier represents said at least one textual identifier.

11. The method of claim 1, wherein the subject message is defined by a message portion within the sequence, wherein said at least one textual identifier comprises a subportion within the message portion, such that the message portion and the subportion comprise a visually integrated and single presentation.

12. The method of claim 1, wherein said at least one other message comprises a message to which the subject message is in reply.

13. The method of claim 1, wherein said at least one other message comprises a user message entered in response to the subject message.

14. The method of claim 1, wherein the presenting of the at least one other message comprises concurrently presenting the at least one other message and the sequence of messages.

15. The method of claim 14, wherein the presenting of the at least one other message comprises presenting the at least one other message in a display panel presented concurrently with the sequence of messages.

16. The method of claim 1, wherein the textual identifier textually represents the relationship of the subject message in the sequence to at least one other message in the sequence.

17. One or more machine-readable storage devices containing machine-readable instructions for implementing the method of claim 1.

18. A data structure encoded on one or more machine-readable storage devices, the data structure including a collection of portions which implement the sequence of messages of claim 1, as annotated by said at least one textual identifier.

19. A system comprising:
   one or more processors; and
   one or more machine-readable storage media comprising instructions that, when executed, cause the one or more processors to implement the method of claim 1.

20. A computerized method for presenting messages to a user, comprising:
   forming a sequence of messages from a plurality of contributors, the messages having a reply-related nexus in which at least one message is in reply to at least one other message, the sequence having a chronological order based on time of message posting and independent of the reply-related nexus of the messages;
   automatically annotating the sequence with textual identifiers, including one or more of:
   (a) a first textual identifier associated with a subject message, the first textual identifier identifying the subject message as a message that is in response to a message of the user;
   (b) a second textual identifier associated with a subject message, the second textual identifier identifying the subject message as a message to which the user has replied with a reply message;
   presenting the sequence thus textually annotated to the user, in a presentation having an order based on the chronological order, wherein the identifiers and the messages are presented concurrently;
   receiving an activation of the first or second textual identifier associated with the subject message; and
   at least partly in response to receiving the activation, presenting the message of the user or the reply message.

21. The method of claim 20, further comprising automatically annotating the sequence with at least one of:

(c) a third identifier associated with a subject message, the third identifier identifying what other message in the sequence the subject message is in reply to;

(d) a fourth identifier associated with a subject message, the textual identifier identifying the subject message as a message created by the user; or (e) a fifth identifier associated with a subject message, the textual identifier identifying a date on which the subject message was last edited.

22. The method of claim 21, further comprising automatically annotating the sequence with three or more of said textual identifiers (a)-(e).

23. The method of claim 21, further comprising automatically annotating the sequence with four or more of said textual identifiers (a)-(e).

24. The method of claim 21, further comprising automatically annotating the sequence with all of said textual identifiers (a)-(e).

25. The method of claim 20, further comprising automatically annotating the sequence with both of said textual identifiers (a) and (b).

26. One or more machine-readable storage devices containing machine-readable instructions for implementing the method of claim 20.

27. A data structure encoded on one or more machine-readable storage devices, the data structure including a collection of portions which implement the sequence of claim 20, as annotated by the textual identifiers.

28. A system comprising:
one or more processors; and
one or more machine-readable storage media comprising instructions that, when executed, cause the one or more processors to implement the method of claim 20.

29. A computerized method for presenting messages to a user from a shared repository of messages, in which the messages have a hierarchical reply-related nexus in which at least one message is in reply to at least one other message, comprising:
determining an identity of the user;
forming a sequence of messages, wherein the sequence chronologically orders the messages based on time of message posting, independent of the hierarchical reply-related nexus of the messages;
customizing the sequence for the user to provide a user-customized sequence to emphasize messages posted by other users in the sequence, the messages emphasized having some relation to the user, wherein the customizing comprises annotating a subject message of the sequence with a textual identifier conveying a relationship between the subject message and at least one other message;
presenting the user-customized sequence to the user in an order based on the chronological order;
receiving an activation of the textual identifier annotating the subject message; and
at least partly in response to receiving the activation, presenting the at least one other message having the relationship to the subject message.

30. The method of claim 29, wherein the at least one other message comprises a response to the subject message.

31. The method of claim 29, wherein the textual identifier indicates that the subject message was a response to the at least one other message.

32. One or more machine-readable storage devices containing machine-readable instructions for implementing the method of claim 29.

33. A system comprising:
one or more processors; and
one or more machine-readable storage media comprising instructions that, when executed, cause the one or more processors to implement the method of claim 29.

34. A computerized method for presenting messages to a user, comprising:
presenting to the user a sequence of messages from one or more contributors, the sequence having at least one textual identifier annotating a subject message in the sequence, said at least one textual identifier forming an integral part of the sequence of messages;
receiving the user's activation of said at least one textual identifier; and
responsively to receiving the activation, presenting to the user supplemental information associated with said at least one textual identifier, wherein the supplemental information is formed based on identified prior behavior of the user and/or plural users which is indicative of interest in one or more items, the prior behavior determined from a source other than the sequence of messages.

35. The method of claim 34, wherein the supplemental information is associated with at least one recommended item.

36. The method of claim 35, wherein said at least one recommended item is based on: (a) an indication, from the user's prior behavior, that the user has interest in a first item; and (b) an indication, from the prior behavior of the plural users, that plural users expressing an interest in the first item also express an interest in a second item, wherein said at least one recommended item pertains to said second item.

37. The method of claim 34, wherein the prior behavior pertains to behavior collected over a span of time in which at least one user engages in plural user sessions.

38. The method of claim 34, wherein the prior behavior pertains to the behavior of the user and/or plural users in identifying said one or more items in one or more catalogues of merchandisable items.

39. The method of claim 38, wherein the identifying said one or more items comprises the purchase of said one or more items.

40. The method of claim 34, wherein presentation of the supplemental information is also based on content of the sequence of messages.

41. The method of claim 34, wherein presentation of the supplemental information is also based on at least one assessed characteristic of the user.

42. One or more machine-readable storage devices containing machine-readable instructions for implementing the method of claim 34.

43. A system comprising:
one or more processors; and
one or more machine-readable storage media comprising instructions that, when executed, cause the one or more processors to implement the method of claim 34.

44. A computerized method for presenting messages to a user, comprising:
determining an identity of the user;
presenting a sequence of messages to the user;
determining a message of the sequence of messages comprises a keyword;
at least partly in response to determining that the message comprises the keyword:
determining at least one recommended item for the user based at least in part on the keyword and prior behavior of the user and/or plural users; and annotating the message with a textual identifier associated with the item;

receiving an activation of the textual identifier annotating the message; and at least partly in response to receiving the activation, presenting supplemental information regarding said at least one recommended item to the user.

45. The method of claim 44, wherein said at least one recommended item is based on: (a) an indication, from the user's prior behavior, that the user has interest in a first item; and (b) an indication, from the prior behavior of the plural users, that plural users that express an interest in the first item also express an interest in a second item, wherein said at least one recommended item pertains to said second item.

46. The method of claim 44, wherein the prior behavior pertains to behavior collected over a span of time in which at least one user engages in plural user sessions.

47. The method of claim 44, wherein the prior behavior pertains to the behavior of the user and/or plural users in identifying said one or more items in one or more catalogues of merchandisable items.

48. The method of claim 47, wherein the identifying said one or more items comprises the purchase of said one or more items.

49. The method of claim 44, wherein presentation of the supplemental information is also based on content of the sequence of messages.

50. The method of claim 44, wherein presentation of the supplemental information is also based on at least one assessed characteristic of the user.

51. The method of claim 44, further comprising annotating the sequence of messages with a symbol associated with the keyword at least partly in response to determining the message comprises the keyword.

52. One or more machine-readable storage devices containing machine-readable instructions for implementing the method of claim 44.

53. A system comprising:

one or more processors; and one or more machine-readable storage media comprising instructions that, when executed, cause the one or more processors to implement the method of claim 44.

* * * * *